No. 738,457. Patented September 8, 1903.

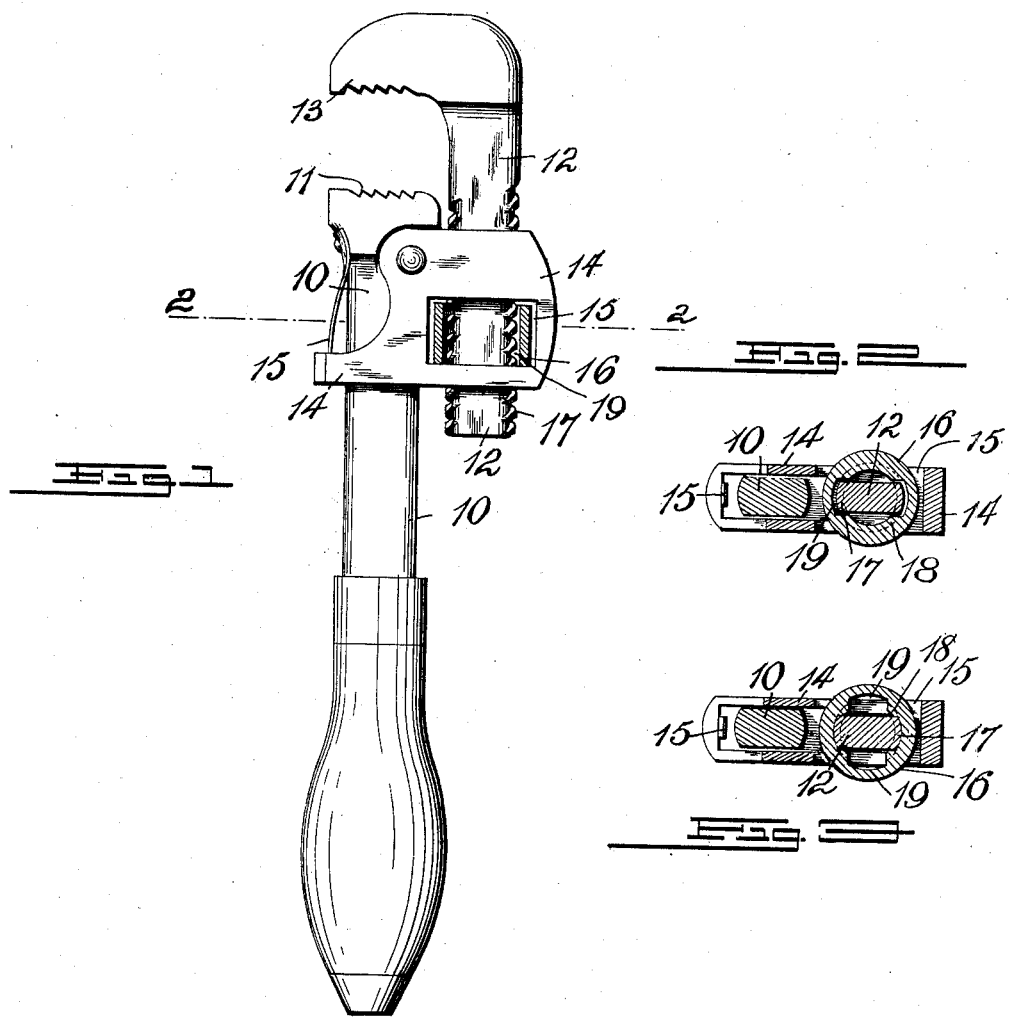

UNITED STATES PATENT OFFICE.

JOHN LA BURT, OF NEW YORK, N. Y., ASSIGNOR TO HIMSELF, AND CARL D. BRADLEY AND ALBERT L. ELIEL, OF PARLIN, NEW JERSEY.

WRENCH.

SPECIFICATION forming part of Letters Patent No. 738,457, dated September 8, 1903.

Application filed January 16, 1903. Serial No. 139,292. (No model.)

*To all whom it may concern:*

Be it known that I, JOHN LA BURT, of the city of New York, county of Kings, and State of New York, have invented certain new and useful Improvements in Wrenches, of which the following is a full, clear, and exact description.

This invention has reference to a wrench that is designed to be quickly adjusted and at the same time being susceptible to a fine adjustment and is shown herein as a Stillson wrench, although the construction is applicable to wrenches of different patterns.

Figure 1 is a side view of my improved adjusting means as applied to a Stillson wrench with the adjusting-nut shown in section. Fig. 2 is a section on line 2 2 in Fig. 1, and Fig. 3 is a similar view with the nut partly rotated.

The wrench is constructed with the usual shank 10, having on the end thereof a jaw 11, and an adjustable shank 12 has a jaw 13 thereon which is adapted to be adjusted so as to move the jaws toward or from one another. A clip 14 is pivotally arranged on the shank 10 and acts to guide the shank 12, being held in its position, as is usual in wrenches of this class, by a spring 15. This clip 14 has an opening 15 therein which receives a nut 16, this nut having an internal-threaded portion 18, which is adapted to engage threads 17 on the shank 12 to operate the same. These threads 17 are shown as being on both edges of the shank 12; but one edge can be left plain, as will be understood. The nut 16 has the internal-threaded portion 18 mutilated in the case of a double-threaded shank 12 at two opposite points, this mutilation in each case exceeding slightly in width the width of the thread on the shank. Now when the threaded nut 16 is turned to bring the mutilation in line with the thread on the shank 12 this shank can be slid up and down to bring the jaws 13 and 11 in any desired relation instantly. When this adjustment is secured, the nut can be slightly turned, as in Fig. 3, from the open position shown in Fig. 2 to lock the jaws in their adjusted position. At the same time a very close adjustment can be secured by a further rotation of the nut 16. In fact, the shank 12 can be actuated for the whole length of its travel by the continual rotation of the nut. The ends of the threads are preferably narrowed or pointed, so that the ends of the threads on the nut and on the shank cannot abut.

Having thus described my invention, what I claim as new, and desire to secure by Letters Patent, is—

1. A wrench comprising a shank, a second shank having a jaw, means on the first shank to guide the second jaw, threads on the edge of the second jaw, a nut in the guiding means adapted to embrace the second shank, screw-threads on the inside of the nut, and a mutilation in the thread on the nut, to release the second shank at a certain point in the nut's rotation.

2. A wrench comprising a shank, a second shank adjustably arranged on the first shank, said shanks having opposing jaws, a nut on the first shank having internal threads adapted to embrace the second shank, threads on the second shank with which the threads on the nut can engage, and a mutilation in the thread on the nut to release the second shank at a certain point in the rotation of the nut.

In testimony whereof I have signed my name to this specification in the presence of two subscribing witnesses.

JOHN LA BURT.

Witnesses:
WM. H. CAMFIELD,
J. G. DUNBAR.